(12) United States Patent
Hollatz

(10) Patent No.: US 8,740,679 B2
(45) Date of Patent: Jun. 3, 2014

(54) COMBINE HARVESTER UNLOADING SYSTEM

(75) Inventor: Brian Jay Hollatz, Bassano del Grappa (IT)

(73) Assignee: Laverda SpA, Breganze (IT)

( * ) Notice: Subject to any disclaimer, the term of this patent is extended or adjusted under 35 U.S.C. 154(b) by 0 days.

(21) Appl. No.: 13/397,016

(22) Filed: Feb. 15, 2012

(65) Prior Publication Data
US 2012/0214561 A1 Aug. 23, 2012

(30) Foreign Application Priority Data

Feb. 17, 2011 (GB) .................................. 1102760.4

(51) Int. Cl.
*A01F 12/46* (2006.01)

(52) U.S. Cl.
USPC ......................................................... 460/114

(58) Field of Classification Search
USPC ......................................................... 460/114
See application file for complete search history.

(56) References Cited

U.S. PATENT DOCUMENTS

| | | | |
|---|---|---|---|
| 4,037,745 A | | 7/1977 | Hengen et al. |
| 4,119,223 A | * | 10/1978 | Fiechter ........................ 414/523 |
| 4,742,938 A | * | 5/1988 | Niewold ........................ 222/381 |
| 4,907,402 A | * | 3/1990 | Pakosh ........................... 56/14.6 |
| 6,729,050 B2 | * | 5/2004 | Whitten et al. ................... 37/96 |
| 7,500,814 B2 | * | 3/2009 | Meyer ............................ 414/327 |
| 2006/0019732 A1 | * | 1/2006 | Hettiger ........................ 460/114 |
| 2007/0191080 A1 | * | 8/2007 | Voss et al. ..................... 460/114 |
| 2010/0137044 A1 | * | 6/2010 | Dillon ........................... 460/114 |

FOREIGN PATENT DOCUMENTS

| | | |
|---|---|---|
| JP | 2005176697 A | 7/2005 |
| JP | 2010104295 A | 5/2010 |
| WO | WO-2010038608 A1 | 4/2010 |

OTHER PUBLICATIONS

UK Search Report for UK Application No. GB1102760.4 Dated Jun. 7, 2011.

* cited by examiner

*Primary Examiner* — Thomas B Will
*Assistant Examiner* — Mai Nguyen

(57) ABSTRACT

A combine harvester unloading system is provided in which an unloading auger (20) is swingable between a stowed position and an unloading position around an upright pivot axis disposed at one end of the auger. A pivotally mounted auger support cradle (26) is moveable between a reception position to engage the underside of the auger when transitioning into the stowed position and a supporting position under the auger when in the stowed position.

10 Claims, 5 Drawing Sheets

COMBINE HARVESTER UNLOADING SYSTEM

CROSS-REFERENCE TO RELATED APPLICATION

The present application claims the benefit of and priority from Great Britain Application No. 1102760.4, filed Feb. 17, 2011, the entire disclosure of which is hereby incorporated by reference.

FIELD OF THE INVENTION

The invention relates to combine harvester unloading systems that comprise an unloading auger swingable between a stowed position and an unloading position around an upright pivot axis disposed at one end of the auger.

BACKGROUND

For many decades, self-propelled combine harvesters have been used by farmers to harvest a wide range of crops including cereals, maize and oil-seed rape. Typically, a combine harvester cuts the crop material, threshes the grain therefrom, separates the grain from the straw, and cleans the grain before storing in an onboard tank. Straw and crop residue is ejected from the rear of the machine.

The collected grain is unloaded into a trailer, parked or driven alongside, via an unloading auger which conveys the grain from the tank(s) to a spout positioned over the trailer. In order to maintain a practical overall machine width, for transport reasons for example, the unloading auger is typically swingable between a stowed position, in which the auger is disposed substantially within the width profile of the combine, and an unloading position in which the spout is positioned at a transverse position spaced away from the combine. Hydraulic actuators are commonly provided to move the auger between the two positions.

To minimise downtime and permit the unloading to be carried out simultaneously to the harvesting operation, tractor and trailer combinations are driven alongside the combine to unload the grain. The increase in header widths over the past years has meant that tractors must space themselves further from the combine during unloading. In turn, this has driven an increase in length of the unloading augers to bridge the increased spacing.

Longer unloading augers place greater demands on their construction and particularly at the elbow due to the increased moment placed thereupon by a loaded auger. To relieve the strain placed upon the elbow joint where the auger attaches to the combine, support devices have been developed to support a portion of the weight of the auger at an intermediate point on its length. Triangulating support struts are often provided at near to the pivoting end of the auger to provide support in both the stowed and unloading positions.

Cradles statically fixed to the combine have also been employed to support a portion of the weight of the auger at an intermediate point when in the stowed position. Such cradles typically offer an outwardly facing ramp which slidingly engages with the underside of the auger when transitioning into the stowed position.

The resistance presented by such cradles when sliding the auger into position places large forces upon the actuator connections sometimes leading to failure. This is compounded by assembly and load variations which make consistent and optimal alignment of the ramp difficult to achieve.

SUMMARY OF INVENTION

It is an object of the invention to provide a combine harvester unloading system which overcomes the aforementioned problems.

In accordance with the invention there is provided a combine harvester unloading system comprising an unloading auger swingable between a stowed position and an unloading position around an upright pivot axis disposed at one end of the auger, and a pivotally mounted auger support cradle moveable between a reception position to engage the underside of the auger when transitioning into the stowed position and a supporting position under the auger when in the stowed position. By pivotally mounting the support cradle, sliding friction between the auger and cradle can be eliminated thus reducing stresses upon any actuator. Furthermore, when in the reception, or tilted, position, the cradle is more tolerant to variation in the height of the auger.

The cradle preferably pivots around an axis which is substantially parallel to the axis of the auger when in the stowed position. This presents an optimal orientation of the cradle pivoting action to receive the auger.

The system may further comprise biasing means to bias the cradle into the reception position when the auger is in the unloading position, wherein the supported weight of the auger holds the cradle in its supporting position when the auger is in the stowed position. Advantageously, this prevents the cradle from undesirably moving into the supporting position when the auger is deployed thus preventing the auger from engaging with the cradle upon stowing. The biasing means preferably comprises a torsion spring mounted around a pin upon which the cradle pivots.

The cradle may comprise adjustment means which allow adjustment of a contact surface, which engages the auger, relative to the pivotal mounting. Advantageously, the adjustment means caters for variations caused by fabrication and assembly tolerances.

In a favoured arrangement, the cradle comprises a mounting bracket which is pivotally mounted to a combine frame, and an engaging member comprising said contact surface, wherein the adjustment means allows adjustment of the engaging member relative to the mounting bracket. The adjustment is preferably made in a substantially vertical direction.

The cradle preferably comprises a cushioned contact surface which engages with the underside of the auger. This dampens shock from impact between the auger and the cradle.

The cradle may be attached to the side of a combine body by a triangulated support strut.

Sensing means may be provided to sense when the cradle is in the supporting position. Preferably, the sensing means comprises a magnet and a reed switch wherein each of the magnet and reed switch are connected to one of the cradle and a supporting bracket for the cradle. Alternatively, the sensing means may comprise a proximity sensor.

BRIEF DESCRIPTION OF THE DRAWINGS

Further advantages of the invention will become apparent from the following description of a specific embodiment with reference to the appended drawings in which.

DESCRIPTION OF EXAMPLE EMBODIMENT

From reading the following description it should be understood that the terms longitudinal and transverse are made in relation to the combine harvester's normal direction of travel. In other words, the term 'longitudinal' equates to the fore and aft direction, whereas the term 'transverse' equates to the crosswise direction, or left and right. Furthermore, the terms 'axial' and 'radial' are made in relation to a rotating body such as a shaft wherein axial relates to a direction along the rotation axis and radial equates to a direction perpendicular to the rotation axis.

Figure 1:
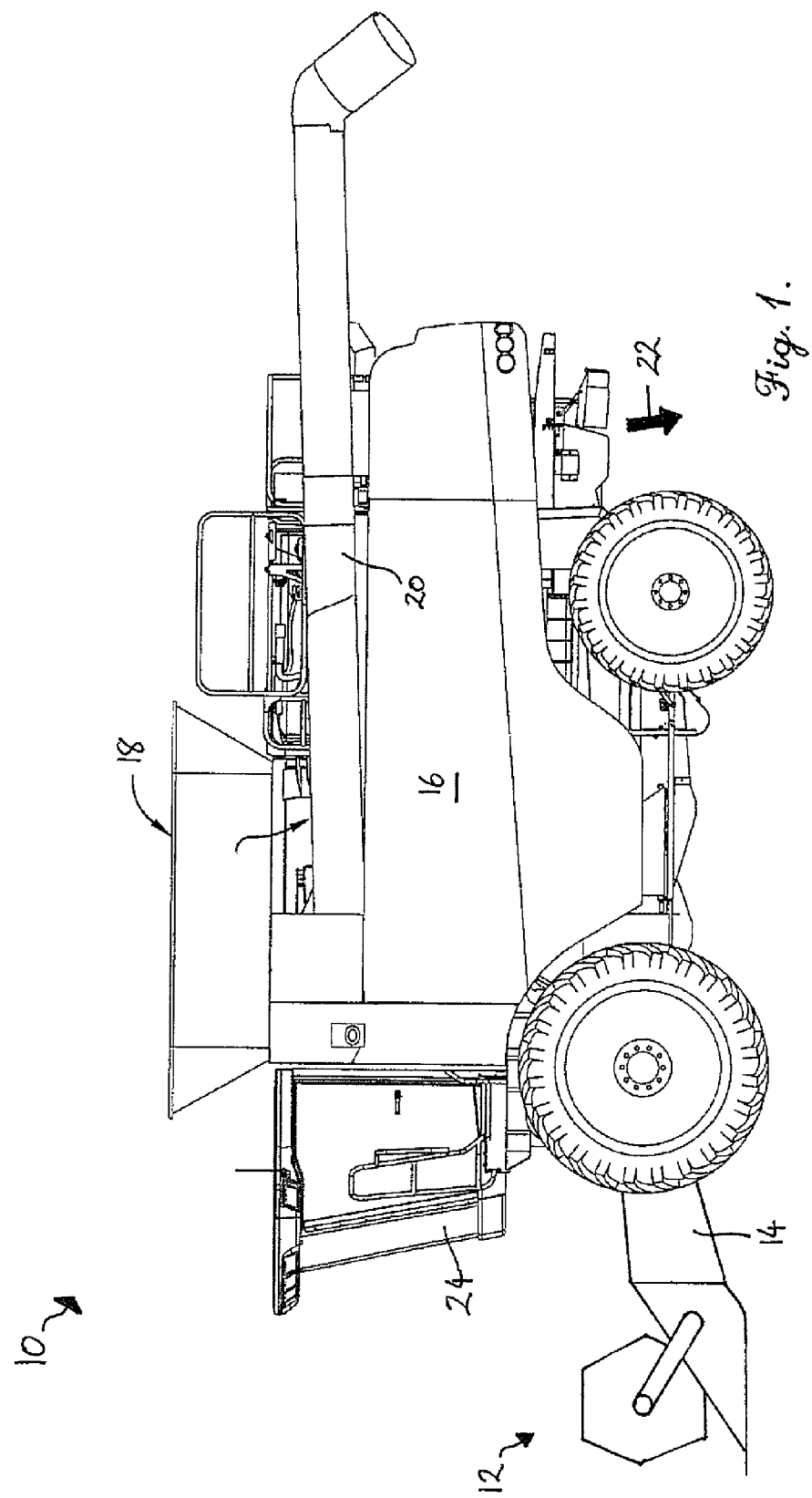
FIG. 1 is a global view of a combine harvester.

With reference to FIG. 1, a self-propelled combine harvester 10 comprises a header 12 which cuts and gathers a strip of crop as the combine harvester is driven across a crop field. An elevator section 14 conveys the crop stream from the header 12 into a central processing apparatus 16. Clean grain separated from the crop stream is collected in a storage tank 18 which is periodically emptied into a trailer (not shown) via an unloading auger 20. Residue material remaining from the crop stream such as straw and chaff is ejected from the rear of the machine represented by arrow 22. For completeness the combine 10 includes a driver's cab 24.

Unloading auger 20 is connected to the main combine body at one end 20a. Although not shown in detail, that end 20a of the unloading auger 20 comprises an elbow which is rotatably mounted on the upper end of an upright delivery auger (not shown). This allows for the unloading auger to be swingable from a stowed position (as shown in FIG. 1) to an unloading (or deployed) position around an upright pivot axis defined by the orientation of the connection between the elbow and the vertical delivery auger. Such connection of an unloading auger is well known.

In the unloading position, a spout disposed at the distal end of unloading auger 20 is positioned above a trailer at a distance transversely spaced from the combine 10.

Figure 2:
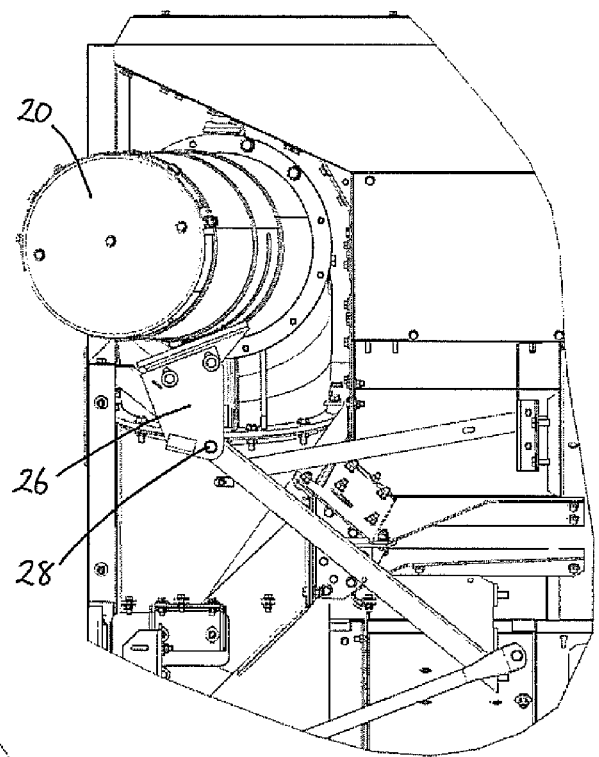
FIG. 2 is a rear view of a combine harvester having an unloading system in accordance with the invention fitted thereto and showing the cradle in the reception position.
Figure 3:
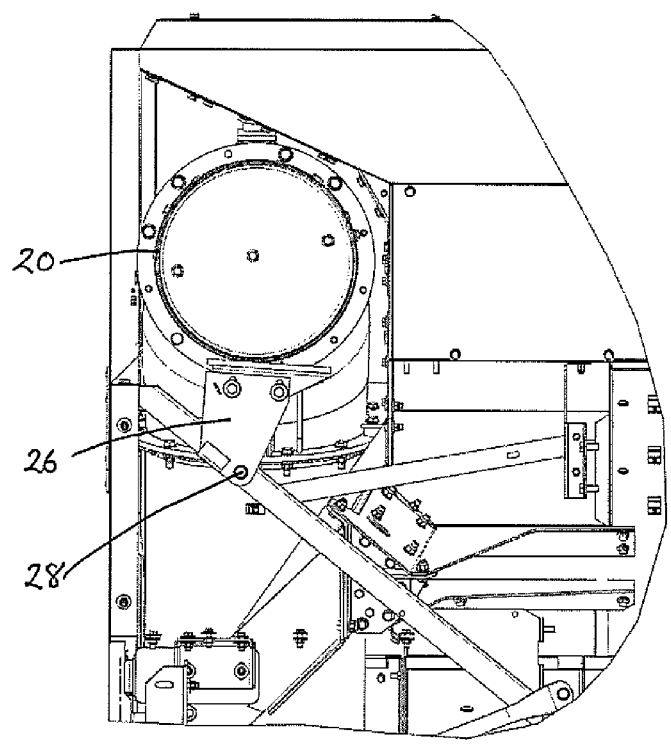
FIG. 3 is the same view as shown in FIG. 2 but with the cradle in the supporting position and the unloading auger in the stowed position.
Figure 4:
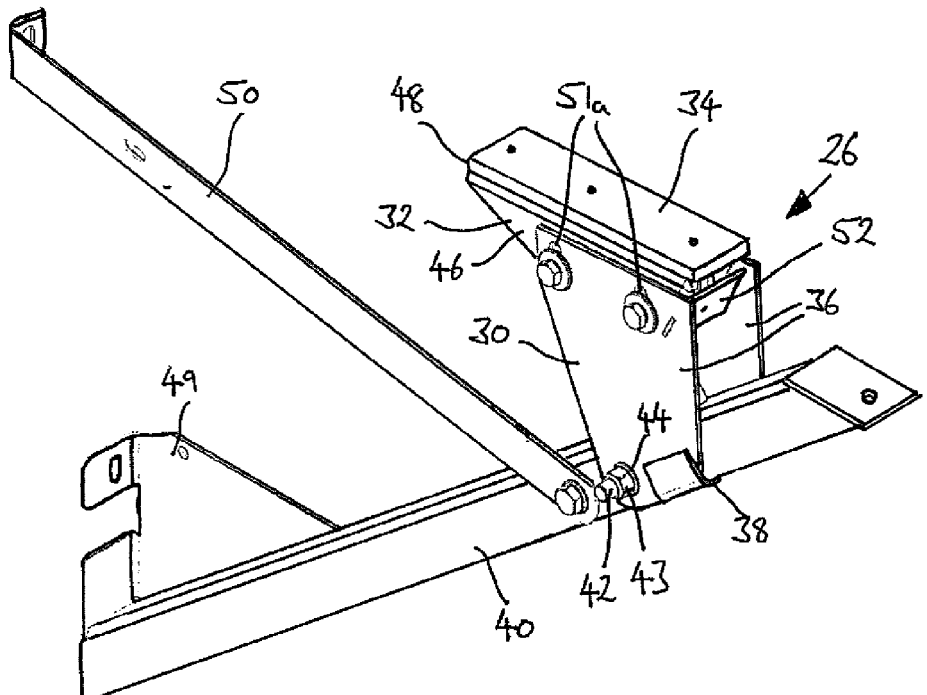
FIG. 4 is an isometric top-left-front view of the cradle in isolation in the supporting position.

With reference to FIGS. 2 and 3, the unloading auger 20 is supported at an intermediate position along its length by a pivotally mounted support cradle 26. In accordance with the invention, the cradle 26 is pivotally mounted around a substantially longitudinal axis 28 and is moveable between a reception position (FIG. 2) to engage the underside of the auger 20 when transitioning into the stowed position and a supporting position (FIG. 3) under the auger 20 when in the stowed position.

In more detail, with reference also to FIGS. 4 to 7, the cradle 26 comprises a mounting bracket 30 which is pivotally mounted to a combine frame, and an engaging member 32 comprising a contact surface 34 which engages the underside of the auger 20. The mounting bracket 30 includes a pair of spaced upright parallel plates 36 connected by a base member 38 and pivotally mounted to a support strut 40 by a bolt 42 which defines the pivot axis 28.

Figure 6:
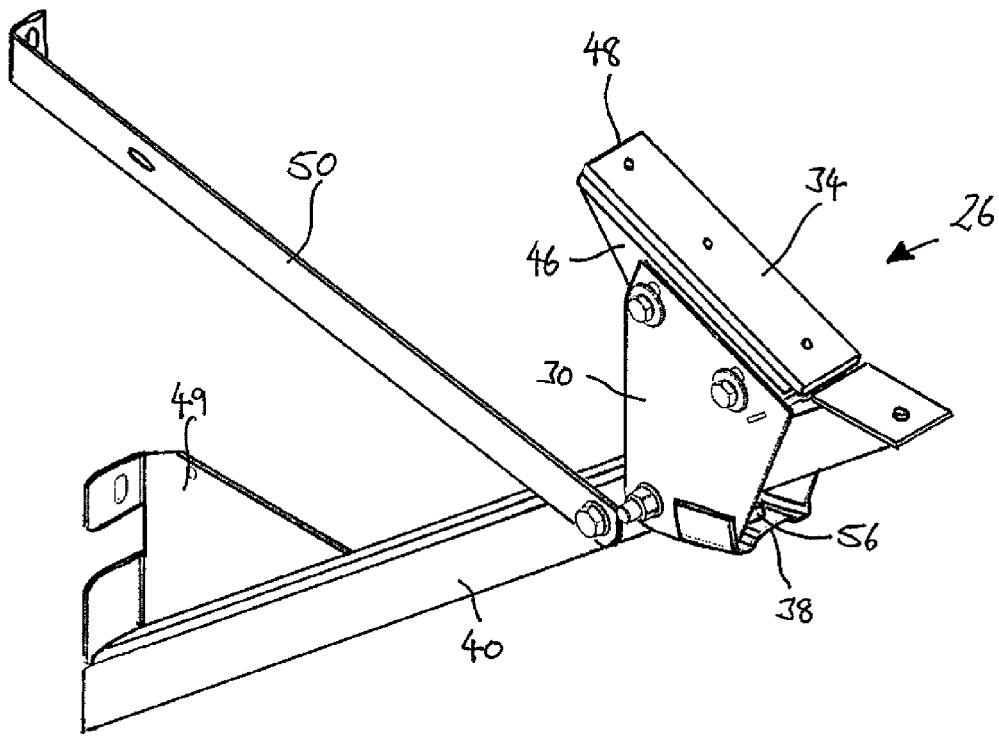
FIG. 6 is an isometric top-left-front view of the cradle in isolation in the reception position.
Figure 7:
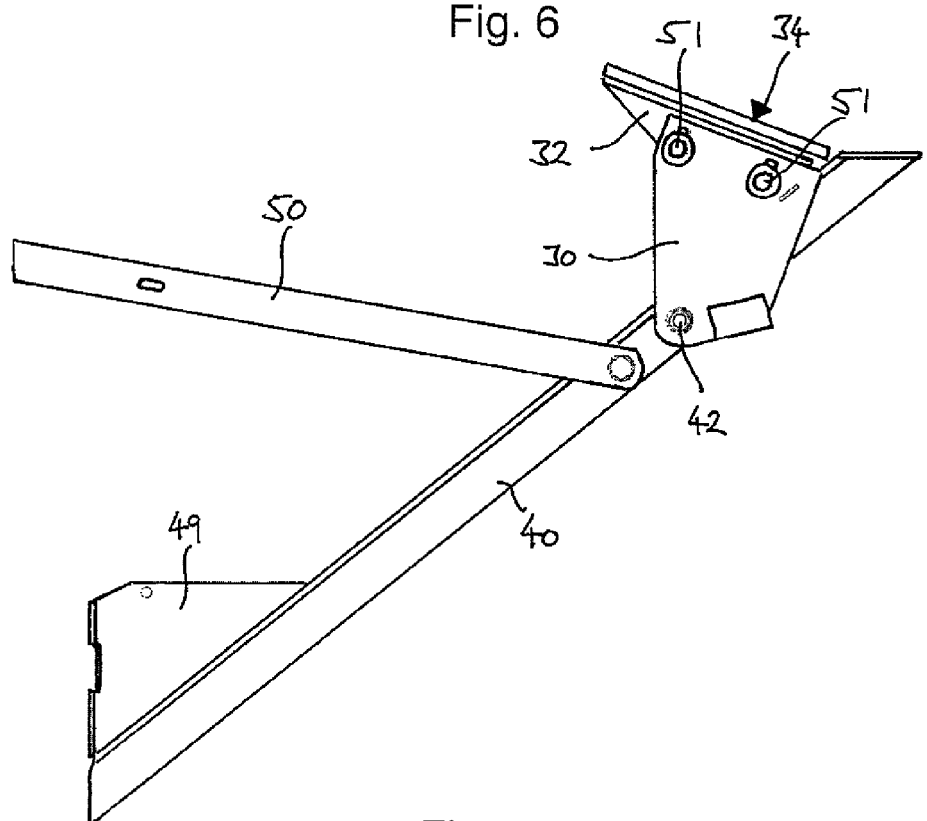
FIG. 7 is a front view of the cradle in the reception position.

Bolt 42 is secured in position by a nut 43 which together hold a torsion spring 44 in place. Although not shown, the torsion spring 44 is connected to the bracket 30 and the strut 40 to bias the cradle 26 into the reception position as shown in FIGS. 6 and 7.

The engaging member 32 comprises a shoe member 46 to which a cushioning member in the form of a rubber pad 48 is secured. The rubber pad 48 serves to damp impacts between the auger 20 and the cradle 26 upon engagement. Alternatively the cushioning member may be omitted and the contact surface 34 may be steel.

The shoe member 46 is connected between the two upright plates 36 by a spaced pair of nut and bolts 51. Elongate holes 51a are provided in the upright plates 36 to allow for up and down adjustment of the engaging member 32 relative to the bracket 30.

The strut 40 is connected by a bracket 49 to the body of the combine 10. A tie 50 connected between the combine body and an intermediate point on the strut 40 provides triangulation support for the cradle 26.

In operation the cradle 26 resides in the reception position (FIGS. 2, 6 and 7) when the unloading auger 20 is away from the stowed position, for example during unloading. A stop element 52 connected between the two bracket plates 36 acts upon the upper face of strut 40 to define the travel limit of the cradle 26. In this reception position, the outward facing edge of contact surface 34 is lowered relative to when in the supporting position. This offers a greater tolerance in the intercept height of the unloading auger 20.

When the auger 20 is swung back into the stowed position, typically by a hydraulic actuator, the underside of the auger tubing engages with the contact surface 34 presented by the rubber pad 48. The momentum and force applied by the moving auger 20 forces the cradle 26 into the supporting position (FIGS. 3, 4 and 5) as a portion of the auger weight is transferred from the elbow connection to the cradle 26. The base member 38 provides a stop which acts upon the underside of strut 40 to set the travel limit of the cradle 26.

Figure 5:
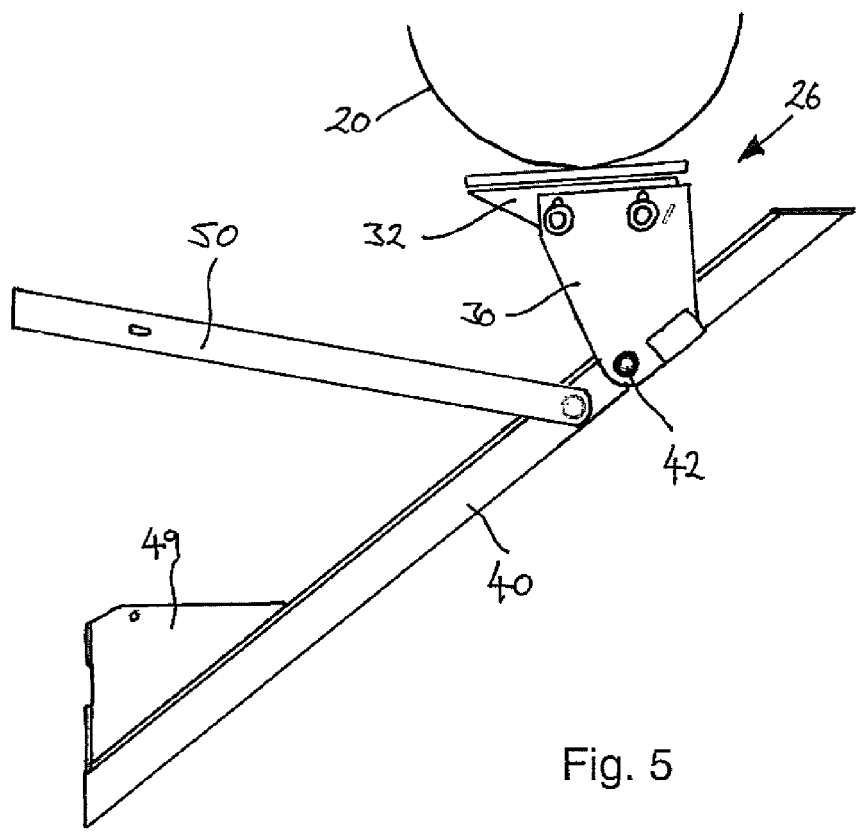
FIG. 5 is a front view of the cradle in the supporting position showing also the position of the auger in the stowed position.

The cradle 26 in the supporting position is positioned off-centre as shown in FIG. 5 in that the contact surface 34 is slightly inclined towards the combine body. This helps hold the auger 20 in the stowed position and removes load from the hydraulic actuator when at rest.

Figure 8:
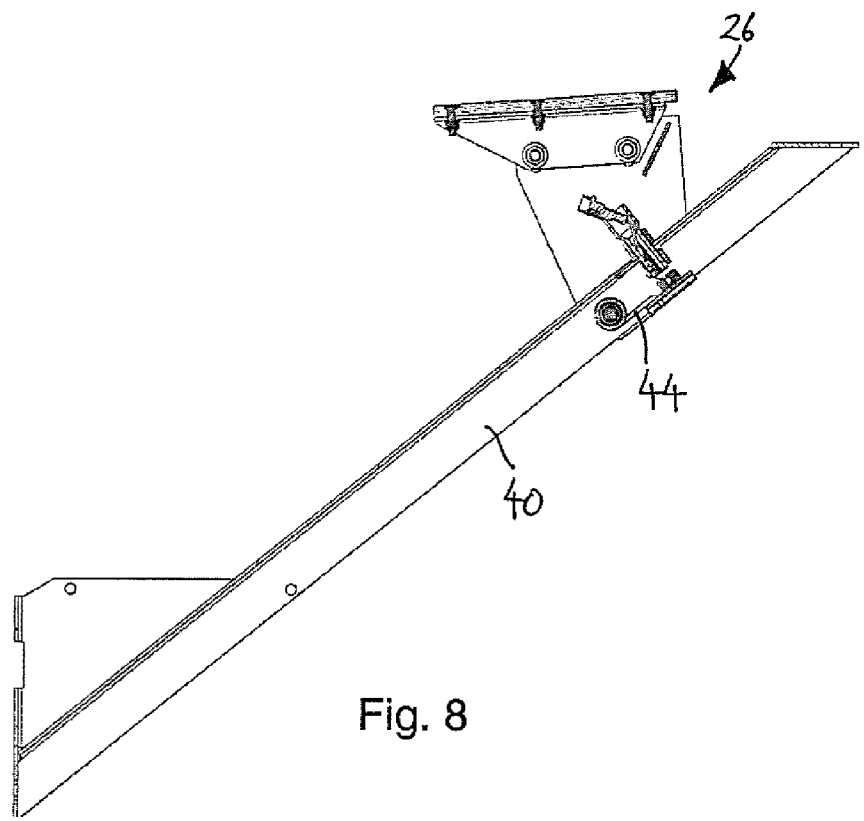
FIGS. 8 and 9 are enlarged front views of the cradle in the supporting position and reception position respectively and showing the details of the auger position sensor.
Figure 9:
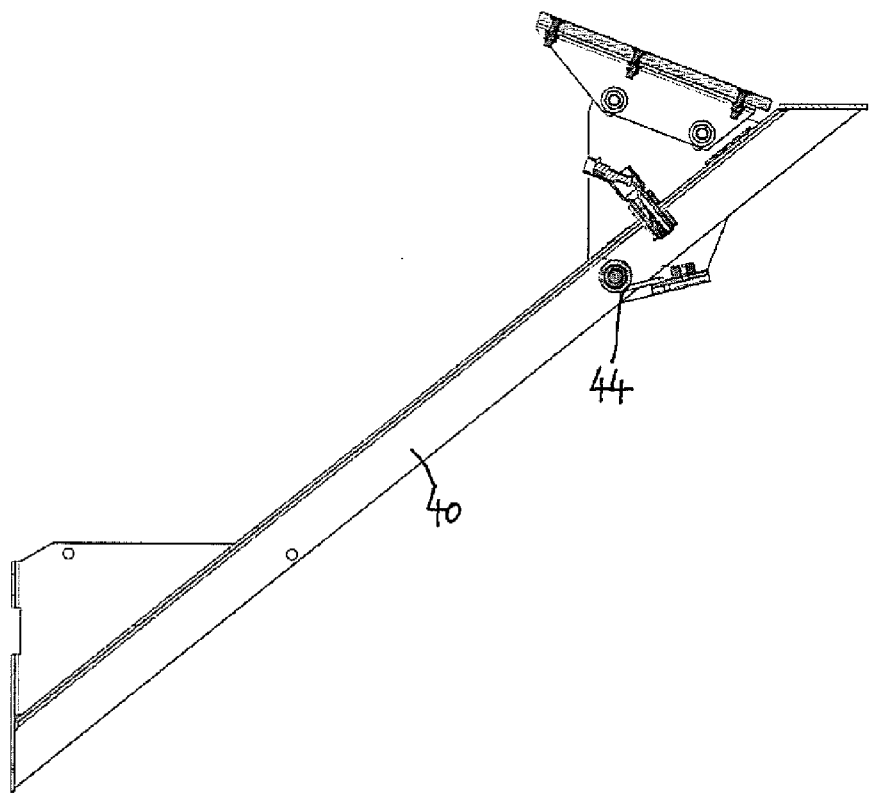

With reference to FIGS. 8 and 9, a magnetic sensor 55 (such as a reed switch) may be attached to the strut 40 between the upright plates 36 whilst a magnet 56 is attached to the upper surface of base member 38. When the cradle is in the supporting position, the sensor/magnet combination is 'closed'. When the cradle is in the reception position, the sensor/magnet combination is 'open'.

Therefore, together, the sensor 55 and magnet 56 provide means to detect when the auger 20 is in the stowed position. An electrical connection (not shown) is made from the sensor 55 to an electronic control unit in the cab 24 to provide an alert to the driver when the auger 20 is deployed or not safely stowed.

Traditionally, such sensing means are associated directly with the auger 20 which is dependent upon accurate alignment of the auger 20. This traditional design has been found to result in failure as the magnet strikes the sensor and disables the function.

However, the pivoting cradle 26 described hereinbefore offers a superior platform to locate the sensor 55 and magnet 56 which can operate with greater tolerance of the auger alignment.

The invention claimed is:

1. A combine harvester unloading system comprising an unloading auger swingable between a stowed position and an unloading position around an upright pivot axis disposed at one end of the auger, and an auger support cradle that is pivotally mounted so as to be pivotally moveable by the auger between a reception position to engage the underside of the auger when transitioning into the stowed position and a supporting position under the auger when in the stowed position, wherein the cradle pivots around an axis which is substantially parallel to the axis of the auger when in the stowed position.

2. An unloading system according to claim 1, further comprising biasing means to bias the cradle into the reception position when the auger is in the unloading position, wherein the supported weight of the auger holds the cradle in its supporting position when the auger is in the stowed position.

3. An unloading system according to claim 2, wherein the biasing means comprises a torsion spring mounted around a pin upon which the cradle pivots.

4. An unloading system according to claim 1, wherein the cradle comprises adjustment means which allow adjustment of a contact surface, which engages the auger, relative to the pivotal mounting.

5. An unloading system according to claim 4, wherein the cradle comprises a mounting bracket which is pivotally mounted to a combine frame, and an engaging member comprising said contact surface, wherein the adjustment means allows adjustment of the engaging member relative to the mounting bracket.

6. An unloading system according to claim 1, wherein the cradle comprises a cushioned contact surface which engages with the underside of the auger.

7. An unloading system according to claim 1, wherein the cradle is attached to the side of a combine body by a triangulated support strut.

8. An unloading system according to claim 1, further comprising sensing means to sense when the cradle is in the supporting position.

9. An unloading system according to claim 8, wherein the sensing means comprises a magnet and a reed switch.

10. An unloading system according to claim 9, wherein each of the magnet and reed switch are connected to one of the cradle and a supporting bracket for the cradle.

\* \* \* \* \*